United States Patent
Ogino

(10) Patent No.: US 11,079,988 B2
(45) Date of Patent: Aug. 3, 2021

(54) IMAGE FORMING APPARATUS, SETTING SYSTEM THEREFOR, SETTING METHOD, AND COMPUTER-READABLE RECORDING MEDIUM HAVING PROGRAM STORED THEREON

(71) Applicant: SHARP KABUSHIKI KAISHA, Sakai (JP)

(72) Inventor: Kumiko Ogino, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 16/929,839

(22) Filed: Jul. 15, 2020

(65) Prior Publication Data
US 2021/0019101 A1 Jan. 21, 2021

(30) Foreign Application Priority Data
Jul. 16, 2019 (JP) .............................. JP2019-131252

(51) Int. Cl.
*G06F 3/12* (2006.01)

(52) U.S. Cl.
CPC .......... *G06F 3/1257* (2013.01); *G06F 3/1204* (2013.01)

(58) Field of Classification Search
CPC ............................. G06F 3/1257; G06F 3/1204
See application file for complete search history.

(56) References Cited

U.S. PATENT DOCUMENTS

| | | | |
|---|---|---|---|
| 2012/0084767 A1* | 4/2012 | Ishimoto | G06F 8/65 717/173 |
| 2012/0268783 A1* | 10/2012 | Nakahara | G06F 3/1204 358/1.15 |
| 2019/0379800 A1* | 12/2019 | Kogure | H04N 1/00938 |

FOREIGN PATENT DOCUMENTS

| | | |
|---|---|---|
| JP | 2009-020560 A | 1/2009 |
| JP | 2017-158210 A | 9/2017 |
| JP | 2017-216540 A | 12/2017 |

\* cited by examiner

*Primary Examiner* — Neil R McLean
(74) *Attorney, Agent, or Firm* — ScienBiziP, P.C.

(57) ABSTRACT

According to an embodiment, a worker selects one of destination places displayed on a screen of a display by means of an operator. Information regarding the selected destination place is sent to a setting processor of a controller. The setting processor of the controller acquires, from among pieces of setting information stored in a storage, the setting information according to the selected destination place information. The setting processor of the controller then performs setting processing for an image forming apparatus, in accordance with the setting information acquired.

5 Claims, 18 Drawing Sheets

| INSTALLATION ENVIRONMENT / SETTING ITEM | STORE (CONVENIENCE STORE, SUPERMARKET, ETC.) | PUBLIC SPACE (MUNICIPAL OFFICE, POST OFFICE, ETC.) | OFFICE | EDUCATIONAL SITE (SCHOOL, PRIVATE TUTORING SCHOOL, ETC.) |
|---|---|---|---|---|
| SUPPORTED SERVICES | COPY, FAX, SCAN, PRINT | COPY, ADMINISTRATIVE SERVICES, POSTCARD PRINT | COPY, FAX, SCAN, PRINT | COPY, FAX, SCAN, PRINT |
| DESIGN/ COLOR OF UI | SHARP DESIGN WITH RELATIVELY HIGH CONTRAST | CHIC AND SUBDUED DESIGN | ⇐ | ⇐ |
| OPERATION SOUND | OPERATION SOUND IS OF CLEARLY AUDIBLE TONE DUE TO NOISY ENVIRONMENT  OPERATION SOUND AT DEFAULT IS RELATIVELY LOUD | OPERATION SOUND IS OF RELATIVELY MUTED TONE DUE TO COMPARATIVELY CALM ENVIRONMENT  OPERATION SOUND AT DEFAULT IS RELATIVELY QUIET | ⇐ | ⇐ |
| SCREEN SAVER | VERSATILE SCREEN SAVER | EXPLANATION FOR SPECIFIC FUNCTIONS SUCH AS INTRODUCTION OF FUNCTION OF ADMINISTRATIVE SERVICES | EXPLANATION FOR ECONOMICAL FUNCTIONS SUCH AS DOUBLE-SIDED PRINT, AGGREGATE COPY, ETC. | ⇐ |

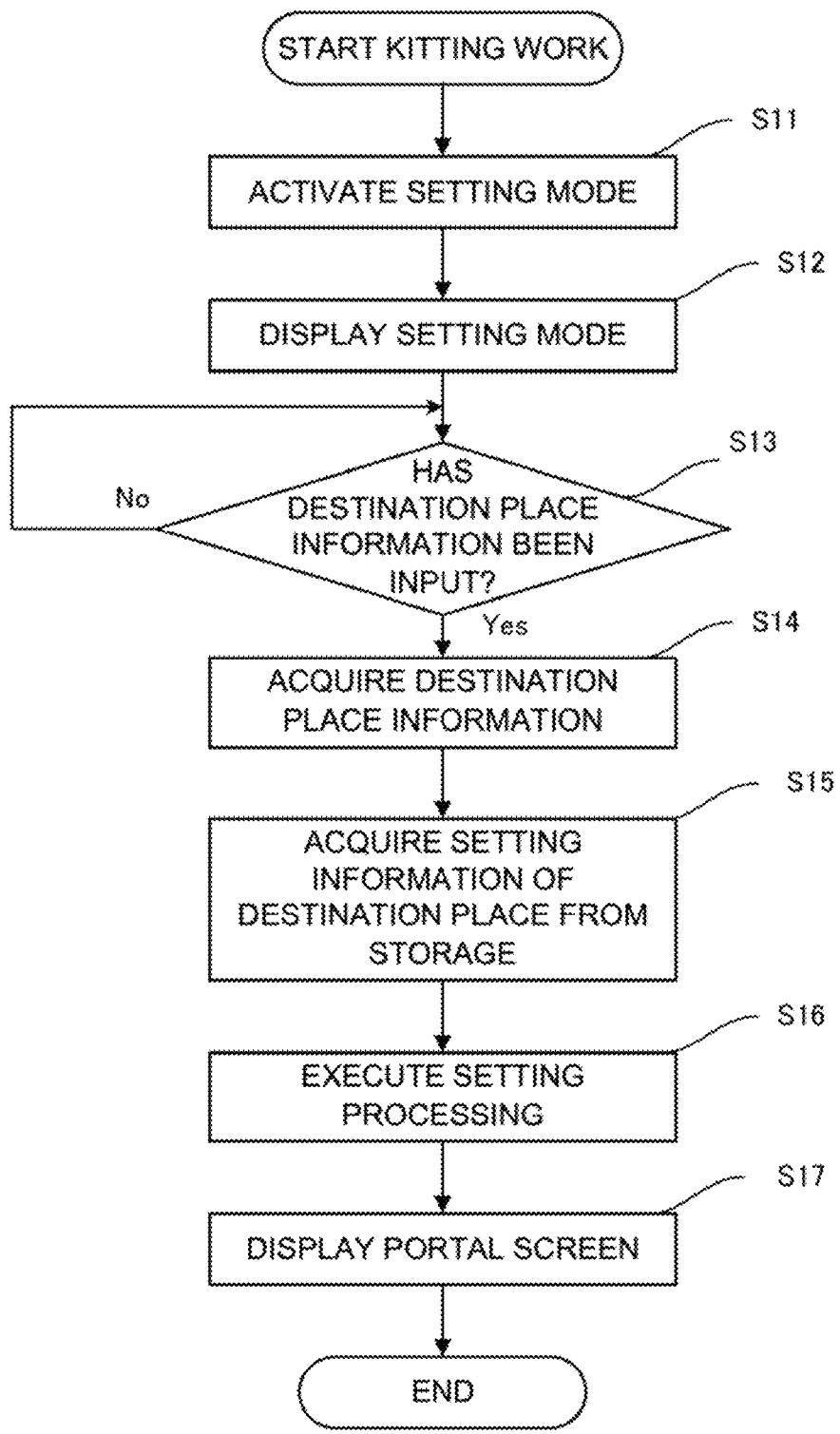

FIG. 4

| INSTALLATION ENVIRONMENT / SETTING ITEM | STORE (CONVENIENCE STORE, SUPERMARKET, ETC.) | PUBLIC SPACE (MUNICIPAL OFFICE, POST OFFICE, ETC.) | OFFICE | EDUCATIONAL SITE (SCHOOL, PRIVATE TUTORING SCHOOL, ETC.) |
|---|---|---|---|---|
| SUPPORTED SERVICES | COPY, FAX, SCAN, PRINT | COPY, ADMINISTRATIVE SERVICES, POSTCARD PRINT | COPY, FAX, SCAN, PRINT | COPY, FAX, SCAN, PRINT |
| DESIGN/ COLOR OF UI | SHARP DESIGN WITH RELATIVELY HIGH CONTRAST | CHIC AND SUBDUED DESIGN | ⇓ | ⇓ |
| OPERATION SOUND | OPERATION SOUND IS OF CLEARLY AUDIBLE TONE DUE TO NOISY ENVIRONMENT  OPERATION SOUND AT DEFAULT IS RELATIVELY LOUD | OPERATION SOUND IS OF RELATIVELY MUTED TONE DUE TO COMPARATIVELY CALM ENVIRONMENT  OPERATION SOUND AT DEFAULT IS RELATIVELY QUIET | ⇓ | ⇓ |
| SCREEN SAVER | VERSATILE SCREEN SAVER | EXPLANATION FOR SPECIFIC FUNCTIONS SUCH AS INTRODUCTION OF FUNCTION OF ADMINISTRATIVE SERVICES | EXPLANATION FOR ECONOMICAL FUNCTIONS SUCH AS DOUBLE-SIDED PRINT, AGGREGATE COPY, ETC.) | ⇓ |

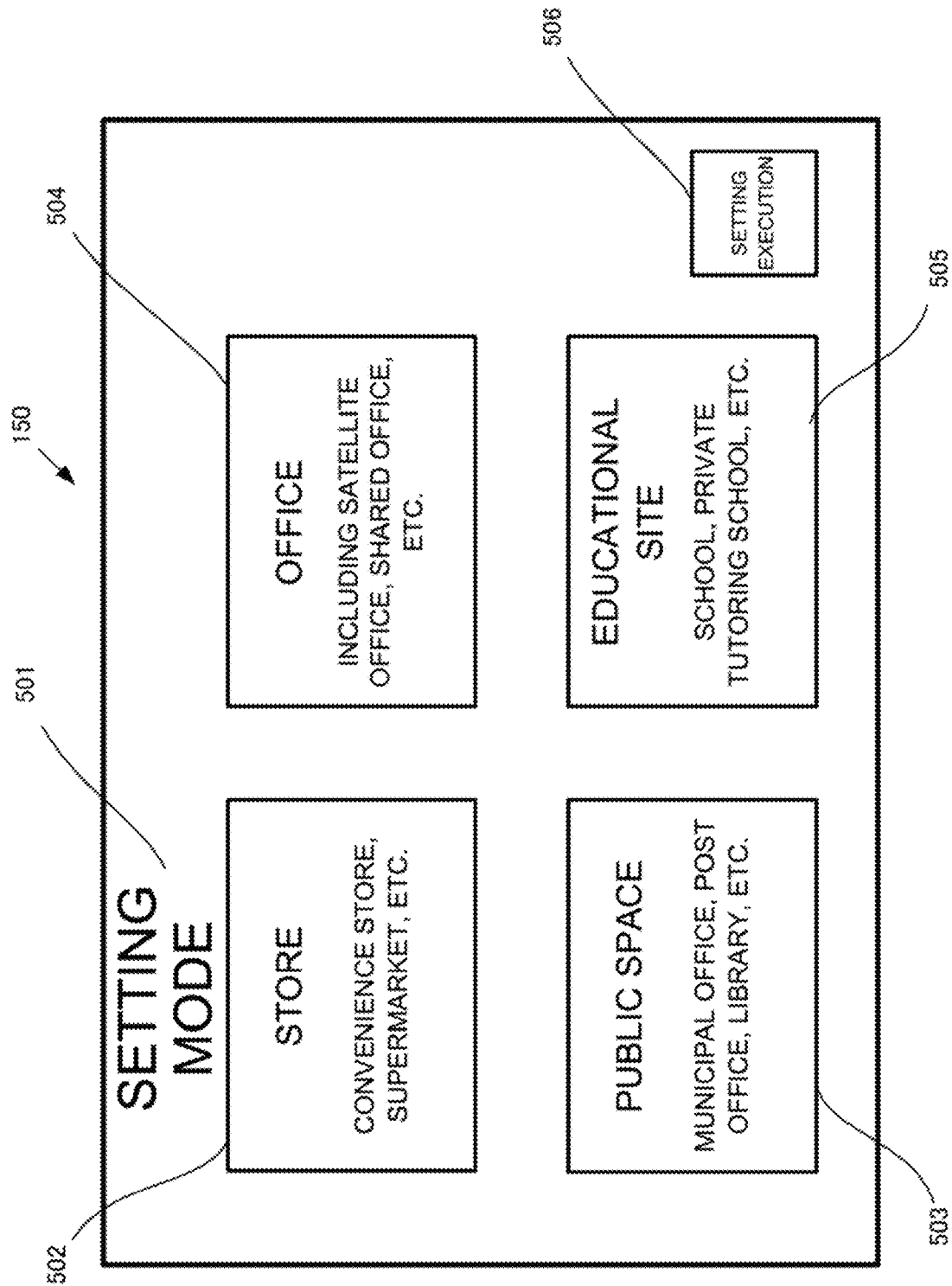

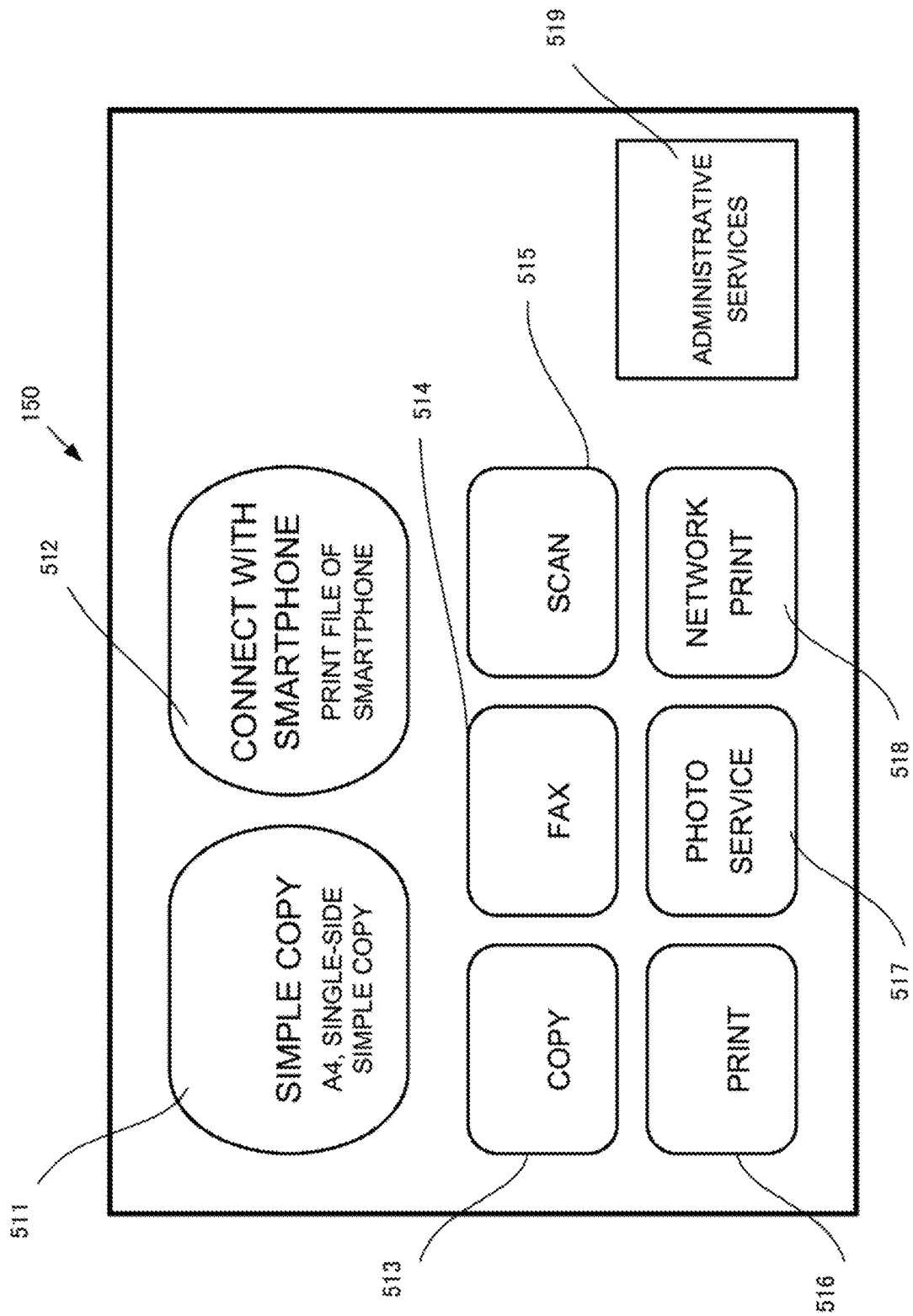

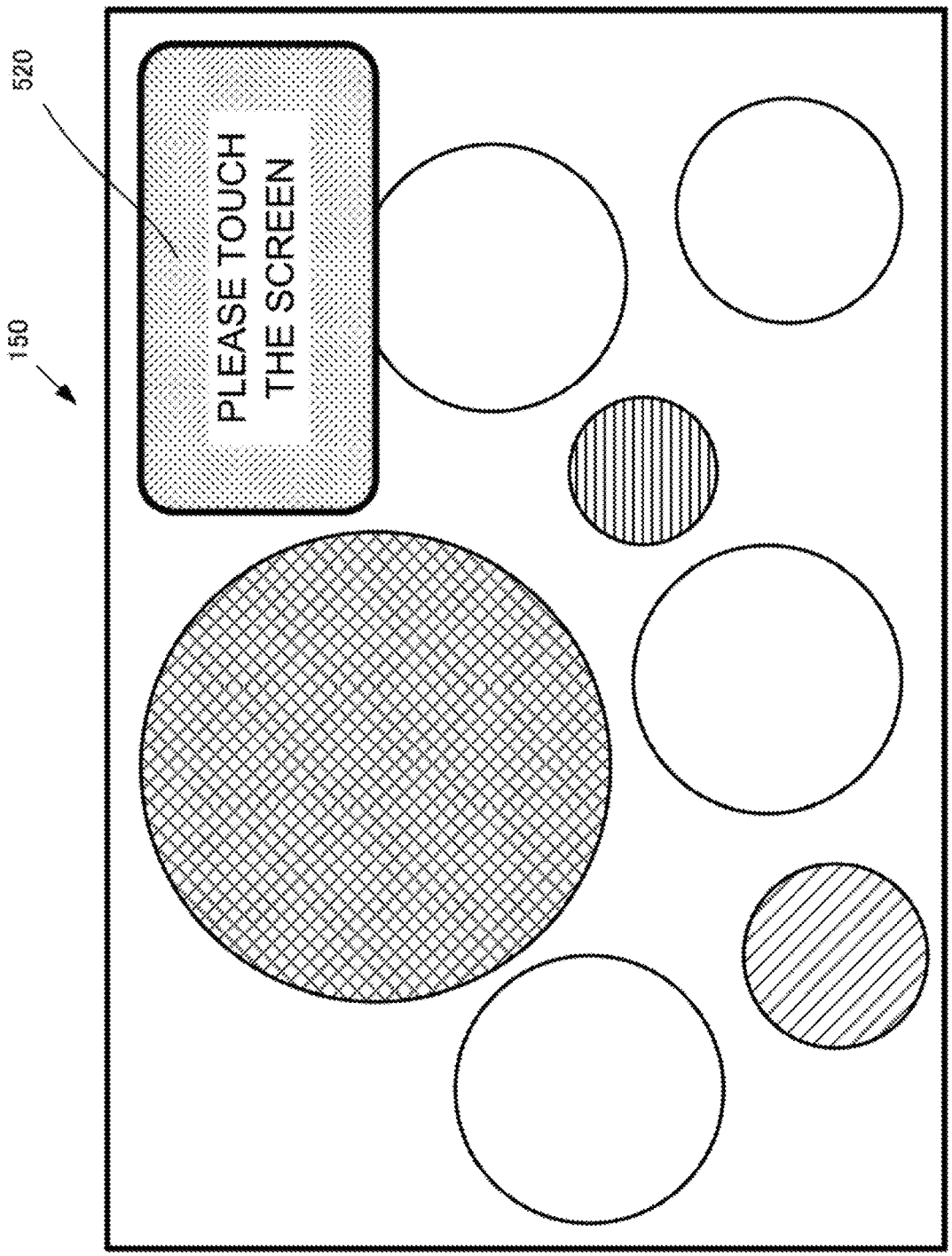

FIG. 16

CERTIFICATE ISSUANCE SERVICE

THIS IS A SERVICE FOR ISSUING A "COPY OF CERTIFICATE OF RESIDENCE" AND A "SEAL REGISTRATION CERTIFICATE" FROM THE MULTI-COPY MACHINE BY USING A MY NUMBER CARD (INDIVIDUAL NUMBER CARD) OR A JUKI CARD (BASIC RESIDENT REGISTER CARD)

THIS SERVICE CAN BE USED BY PRESSING "ADMINISTRATIVE SERVICES"

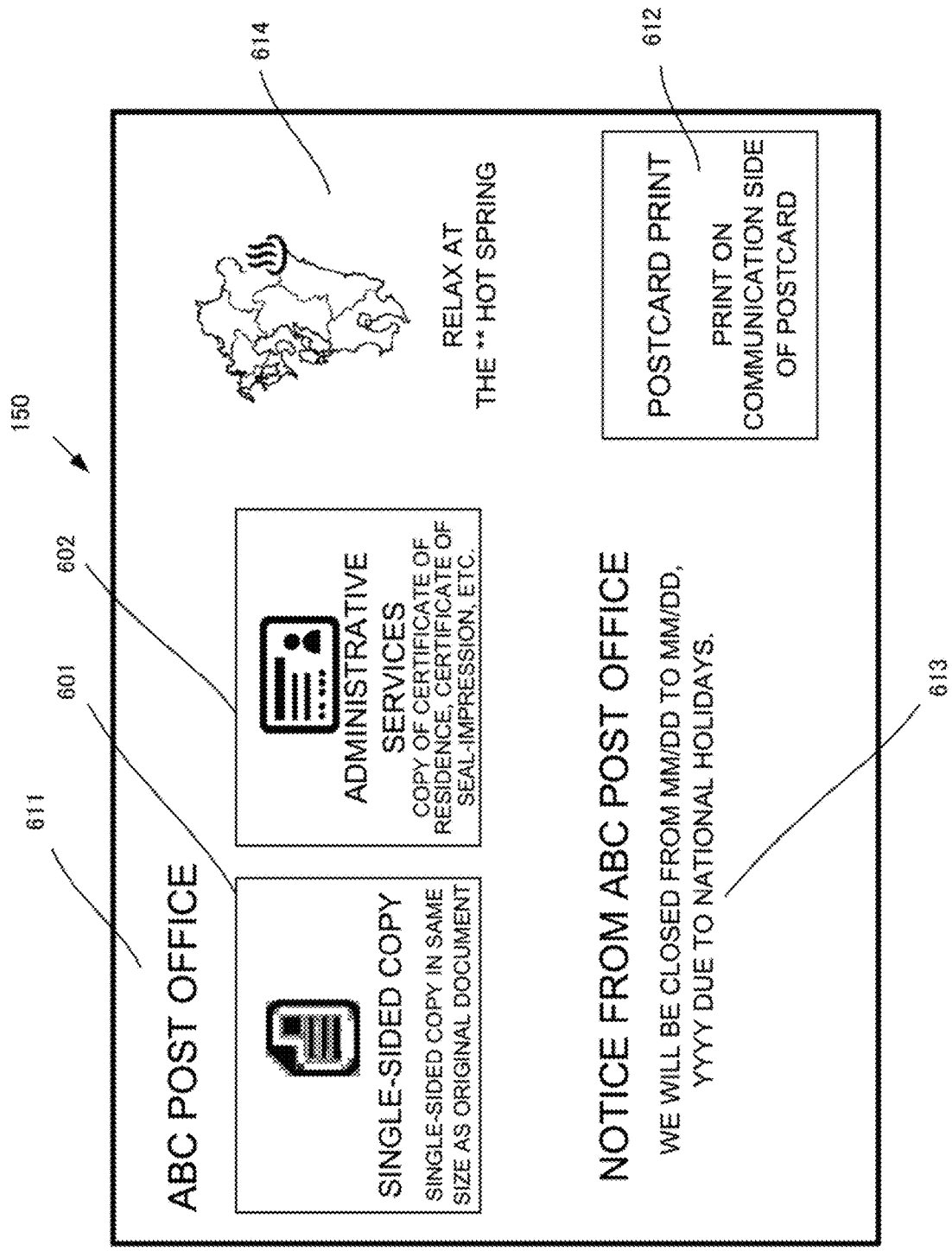

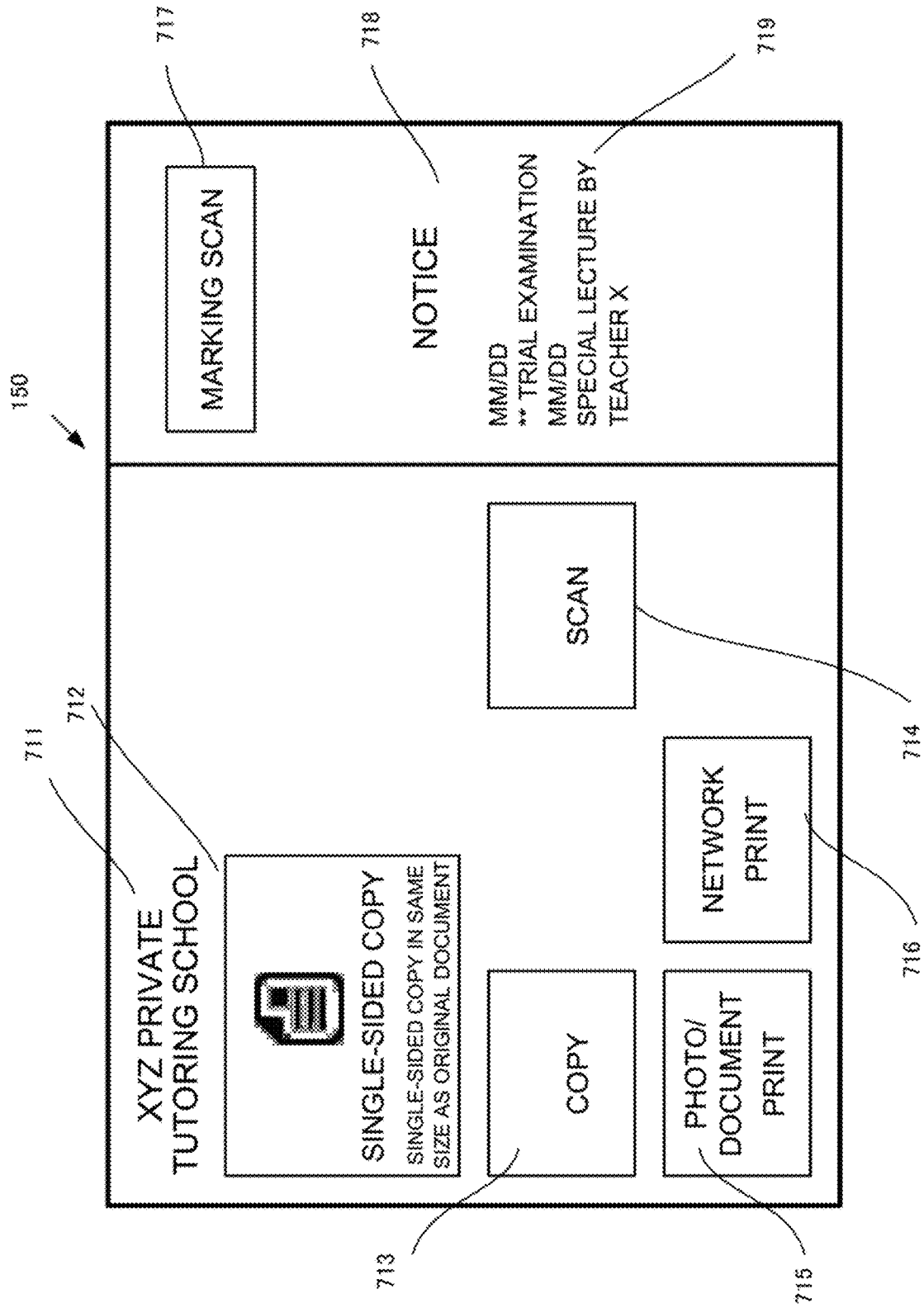

IMAGE FORMING APPARATUS, SETTING SYSTEM THEREFOR, SETTING METHOD, AND COMPUTER-READABLE RECORDING MEDIUM HAVING PROGRAM STORED THEREON

BACKGROUND OF THE INVENTION

Field of the Invention

The present invention relates to an image forming apparatus which automatically performs setting work with setting content suitable for an installation environment/place/region, etc., a setting system therefor, a setting method, and a computer-readable recording medium having a program stored thereon. This Nonprovisional application claims priority under 35 U.S.C. § 119(a) on Patent Application No. 2019-131252 filed in Japan on 16 Jul. 2019, the entire contents of which are hereby incorporated by reference.

Description of the Background Art

Generally, a multifunction peripheral (MFP) is a device having the functions of, for example, a copying machine, a printer, a scanner, and a fax machine, and is installed in various places. For example, the places where the MFPs are installed are stores such as a convenience store and a supermarket, public spaces such as a municipal office, a post office, and a library, offices including a shared office, and educational sites such as a private tutoring school and a school. Further, the setting content to be applied varies according to the installation environments as described above. Accordingly, after manufacturing and shipping, kitting work, more specifically, setting work according to a destination place, is performed for the MFP at a hub in a big city, for example, for each destination place. Further, after a product for which the kitting work is complete has been conveyed to an installation site and is installed, a serviceman makes detailed settings suitable for that place or region, etc. For example, as disclosed in Japanese Unexamined Patent Application Publication No. 2009-20560, it is necessary to make the setting to display an advertisement suitable for the region according to the installation site.

However, in the kitting work and installation work, the setting content is varied depending on the destination place, and thus precise work by manpower has been required. Since the kitting work is performed collectively at a hub in a big city, for example, there are a large number of devices needing the setting work, and a worker is required to set the devices one by one according to a manual, which has been causing much trouble and consuming the time.

Moreover, at the installation site, the serviceman conventionally makes the settings individually in accordance with the manual corresponding to the place or region. For this reason, efforts and time are required.

In view of the above circumstances, the present invention aims to provide an image forming apparatus which automatically performs the setting work in consideration of the installation environment/place/region, etc., a setting system therefor, a setting method, and a computer-readable recording medium having a program stored thereon.

SUMMARY OF THE INVENTION

The present invention relates to an image forming apparatus which is characterized by comprising:

a destination place information acquirer which acquires destination place information regarding a destination place of installation;

a storage which stores respective pieces of information including setting information regarding a setting according to the destination place;

a setting information acquirer which acquires the setting information from the storage, on the basis of the destination place information acquired by the destination place information acquirer; and a setting processor which implements the setting on the basis of the setting information acquired.

Further, the present invention relates to a setting system for an image forming apparatus, whereby a setting for the image forming apparatus is made, which is characterized by comprising:

a destination place information acquirer which acquires destination place information regarding a destination place where the image forming apparatus is to be installed;

a storage which stores respective pieces of information including setting information regarding the setting according to the destination place;

a setting information acquirer which acquires the setting information from the storage, on the basis of the destination place information acquired by the destination place information acquirer; and a setting processor which implements the setting on the basis of the setting information acquired.

Furthermore, the present invention relates to a setting method for an image forming apparatus, whereby a setting for the image forming apparatus is made, which is characterized by comprising:

a destination place information acquisition step of acquiring destination place information regarding a destination place where the image forming apparatus is to be installed;

a setting information acquisition step of acquiring from a storage storing respective pieces of information including setting information regarding the setting according to the destination place, the setting information, on the basis of the destination place information acquired in the destination place information acquisition step; and a setting processing step of implementing the setting on the basis of the acquired setting information.

Moreover, the present invention relates to a non-transitory computer-readable recording medium storing a program for causing a computer to implement each of the above steps of the setting method for an image forming apparatus.

According to the present invention, the image forming apparatus itself and the setting system including the server and the like automatically perform the setting work with the setting content suitable for the environment/place/region, etc., where the image forming apparatus is to be installed. Thus, the present invention can bring about an excellent advantage of being able to save effort and time, and perform efficient work.

BRIEF DESCRIPTION OF THE DRAWINGS

FIG. 3 is a flowchart illustrating setting processing performed by the image forming apparatus according to the first embodiment in kitting work;

FIG. 4 is a table indicating typical setting items according to installation environments;

FIG. 5 is a diagram illustrating screen display in a setting mode of the image forming apparatus according to the first embodiment;

FIG. 6 is a diagram illustrating a portal screen of the image forming apparatus according to the first embodiment after setting is complete;

FIG. 7 is a diagram illustrating a screen saver screen of the image forming apparatus according to the first embodiment;

FIG. 16 is a diagram illustrating a screen saver screen of the image forming apparatus according to the second embodiment;

FIG. 17 is a diagram illustrating a portal screen of the image forming apparatus according to the second embodiment after setting by the installation work is complete; and FIG. 18 is a diagram illustrating a portal screen of an image forming apparatus according to a third embodiment of the present invention.

DESCRIPTION OF THE PREFERRED EMBODIMENTS

Hereinafter, embodiments of the present invention will be described with reference to the accompanying drawings. Note that the embodiments described below are merely examples for describing the present invention, and the technical scope of the invention defined by the claims is not limited to the scope described in the present specification.

First Embodiment

Hereinafter, a first embodiment of the present invention will be described with reference to the accompanying drawings.

Figure 1:
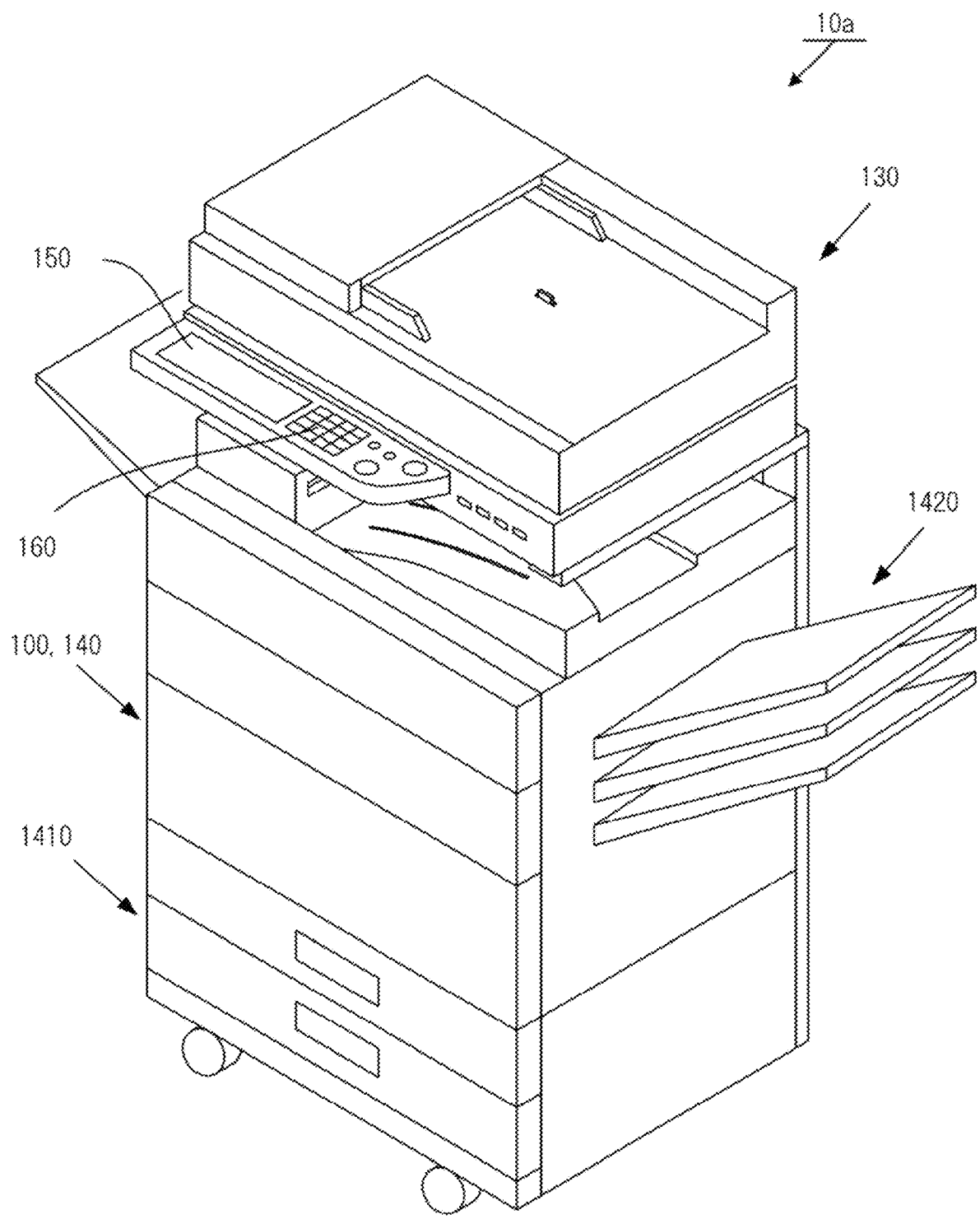
FIG. 1 is an explanatory diagram illustrating a configuration of an image forming apparatus according to a first embodiment of the present invention.
Figure 2:
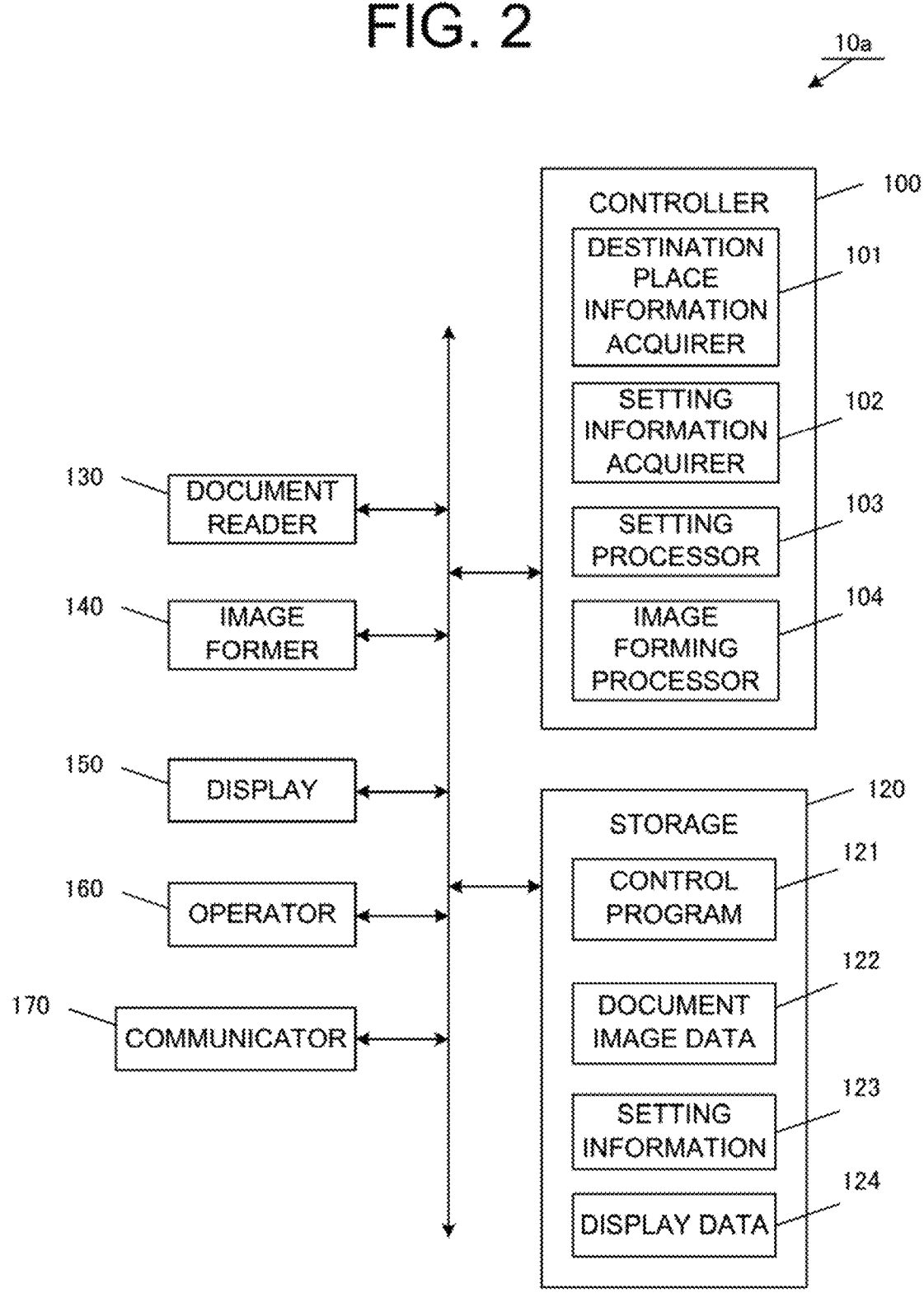
FIG. 2 is a block diagram illustrating a configuration of the image forming apparatus according to the first embodiment.

FIG. 1 is an explanatory diagram illustrating a configuration of an image forming apparatus according to the first embodiment of the present invention; FIG. 2 is a block diagram illustrating a configuration of the image forming apparatus; FIG. 3 is a flowchart illustrating setting processing performed by the image forming apparatus in kitting work; FIG. 4 is a table indicating typical setting items according to installation environments; FIG. 5 is a diagram illustrating screen display in a setting mode of the image forming apparatus; FIG. 6 is a diagram illustrating a portal screen of the image forming apparatus after setting is complete; and FIG. 7 is a diagram illustrating a screen saver screen of the image forming apparatus.

In the first embodiment, setting work is performed for an image forming apparatus 10a by kitting work according to the installation environment of a destination place. In this case, it is assumed that the image forming apparatus is provided with a setting mode, and a worker operates the image forming apparatus to make the setting.

Description of Outline

The image forming apparatus 10a illustrated in FIG. 1 is a multifunction peripheral (MFP) installed in a convenience store, for example, and includes a plurality of modes. The image forming apparatus 10a in the present embodiment includes the modes as described below.

The modes include a setting mode for making the setting of the image forming apparatus 10a in the kitting work and the installation work, and an image forming mode for performing the processing for image forming in the image forming apparatus 10a. Details of the setting mode will be described later. The image forming mode is a mode whereby general functions such as a copy function, a fax function, and a scanner function can be realized. When the image forming apparatus 10a is in a copy mode, the image forming apparatus 10a can execute a copy job. In a fax mode, a fax job can be executed, and in a scanner mode, a scanner job can be executed.

In the following, the copy job is briefly described. First, a document is set on a document reader 130, and a copy operation is performed by way of an operator 160. A user can confirm the set document size, paper size, and copy setting (the setting for, for example, single-sided print, double-sided print, or aggregate print) on a display 150.

When the user performs the copy start operation by means of the operator 160, copy processing is executed. Specifically, the document reader 130 reads the document set by the user. A controller 100 which will be described later generates image data from the document read by the document reader 130.

An image former 140 generates an image based on the image data on a sheet of paper conveyed from a paper tray 1410, and outputs the sheet to a paper discharge tray 1420. In the present embodiment, the paper is recording paper or a recording paper sheet on which an image is to be formed. The paper includes not only ordinary plain paper, but also a film or the like as long as image formation is possible thereon besides various paper media such as cardboard and glossy paper.

Next, the fax job is briefly described.

When a fax is to be sent, a document is set on the document reader 130, and a fax sending operation is performed by way of the operator 160. The user can confirm the set document size and transmission settings (a destination fax number, etc.) on the display 150.

When the user performs the fax start operation by means of the operator 160, fax processing is executed. The controller 100, which will be described later, performs procedures for communication with a communication counterpart by means of a communicator 170. Further, when a transmission enabled state is ensured, the controller 100 performs the processing of sequentially transmitting data to the communication counterpart via a communication line after carrying out necessary processing on a compressed file, such as changing the compression format.

Also, when a fax is to be received, the controller 100 receives the compressed file sent from the communication counterpart while performing the procedures for communication by means of the communicator 170, and performs decompression processing on the received compressed file by a compression/decompression processor not illustrated. Further, the controller 100 performs various kinds of image processing on image data, and outputs the processed data to the image former 140. The image former 140 forms an output image on a recording sheet, on the basis of the output image data.

Next, the scanner job is briefly described.

First, a document is set on the document reader 130, and a scanner operation is performed by way of the operator 160. The user can confirm the set document size and output image settings (an image file type, etc.) on the display 150.

When the user performs the scan start operation by means of the operator 160, scanner processing is executed. Specifically, the document reader 130 reads the document set by the user. The controller 100 which will be described later generates image data from the document read by the document reader 130.

The image forming apparatus 10a executes various jobs by combining the above-described functions.

Functional Configuration of Image Forming Apparatus

A functional configuration of the image forming apparatus 10a will be described with reference to FIG. 2.

The controller 100 is a functional part for controlling the whole of the image forming apparatus 10a. The controller 100 realizes various functions by reading and executing a control program 121 stored in a storage 120, and is composed of one or more arithmetic devices (such as a central processing unit [CPU]). The functions realized by the controller 100 will be described below.

The controller 100 comprises: a destination place information acquirer 101 which acquires destination place information including an installation site and the like; a setting information acquirer 102 which acquires, from a storage, setting information suitable for the destination place; a setting processor 103 which performs setting processing in the setting mode; and an image forming processor 104 which performs image forming processing in the image forming mode. The image forming processor 104 executes the copy function, the fax function, the scanner function, and the like.

The copy function, the fax function, and the scanner function are functions that are executed in a general multi-function machine. The operation and processing of each of the above functions are conventional techniques, and the above functions can be realized by the known processing.

For example, each of the functions can be realized by referring to the invention disclosed in, for example, Japanese Unexamined Patent Application Publication No. 2017-216540 (IMAGE PROCESSING APPARATUS, IMAGE FORMING APPARATUS, PROGRAM, AND RECORDING MEDIUM), or Japanese Unexamined Patent Application Publication No. 2017-158210 (IMAGE TRANSMISSION DEVICE, IMAGE TRANSMISSION METHOD, AND IMAGE FORMING APPARATUS PROVIDED WITH IMAGE TRANSMISSION DEVICE), and applying such inventions being disclosed.

The storage 120 is a functional part in which a program and data are stored. The storage 120 is composed of, for example, a semiconductor memory such as a solid-state drive (SSD), or a hard disk drive (HDD).

The storage 120 stores a control program 121, document image data 122, setting information 123, and display data 124.

The control program 121 is a program related to operation control of the image forming apparatus 10a. The document image data 122 is image data of a document read by the document reader 130. The setting information 123 is information on the setting content according to the installation environment of each destination place. The display data 124 is display information regarding the operation of the image forming apparatus 10a. For example, display data of a portal screen that is first displayed, and display data of a screen saver screen correspond to the above.

The document reader 130 is to read an image of the document and generates the image data. The document reader 130 is composed of, for example, a scanner device including a device such as a contact image sensor (CIS) or a charge-coupled device (CCD) which converts optical information into an electric signal.

For example, the document reader 130 reads the document placed on a placement table within a range set by the document size, and outputs the read document as the image data. Note that the document may be set on the placement table, or set on an automatic document feeder (ADF).

The image former 140 is a functional part for forming the image data on a recording medium (for example, recording paper). For example, the recording paper is fed from the paper tray 1410 shown in FIG. 1, and after an image has been formed on the surface of the recording paper in the image former 140, the recording paper is discharged from the paper discharge tray 1420. The image former 140 is composed of, for example, a laser printer using an electro-photographic method.

Also, normally, one or more paper trays 1410 are provided, and sheets of paper are stored therein.

The display 150 displays various states of the image forming apparatus 10a, and displays the state of operation input. For example, the display 150 is composed of a liquid crystal display (LCD), an organic EL panel, or an electronic paper using an electrophoretic method.

The operator 160 is a button, a switch, etc., which receives an operation input from the user. The operator 160 may be realized by hardware input devices such as a switch and a keyboard, or may be realized by a touch panel or the like formed integrally with the display 150. In this case, it suffices that a method of detecting an input on the touch panel is a general detection method such as a resistive film type, an infrared type, an electromagnetic induction type, or a capacitive type.

The operator 160 of the present embodiment is provided with a hardware input device and a touch panel of the display 150, and the aforementioned elements can be operated individually.

The communicator 170 communicates with other devices. For example, it suffices that the communicator 170 includes an interface connectable to a network, and can communicate with the other devices via a wired/wireless local area network (LAN). Note that, through a universal serial bus (USB) interface or the like, image data may be sent to or received from the other device (for example, a USB flash drive). Also, the communicator 170 can be connected to a communication network such as a public network, a local area network, or the Internet, and is capable of sending a compressed file to the outside via the communication network by a means of communication such as facsimile or e-mail.

The image forming apparatus 10a may further comprise a necessary function apart from the above-described structures. For example, by addition of a charge management portion, a management portion which allows the image forming apparatus 10a to be used only when the user inserts money for the fee may be provided.

Kitting Work

To carry out the kitting work, a workplace is arranged at a hub in a big city, for example, and a worker makes the setting for the image forming apparatuses individually for each destination place.

For example, as illustrated in FIG. 4, according to the installation environments of the destination places, it is assumed that the setting is made for four types of installation environments, i.e., a store (a convenience store or a supermarket), a public space (a municipal office, a post office, a library, etc.), an office (including a satellite office, etc.), an educational site (a private tutoring school, a school, etc.). In a table shown in FIG. 4, as typical setting items, supported services, design/color of a user interface (UI), an operation sound, and a screen saver are described specifically.

In the present embodiment, four types of installation environments are presented as the installation environments of the destination places. However, the installation environments are not limited to the above. For example, the installation environment can be further classified into smaller groups so that the store, for example, may be set separately as a convenience store and a supermarket. Also, the setting items are not limited to the above.

In the storage 120 of the image forming apparatus 10a, pieces of setting information according to respective installation environments are stored. Examples of the setting information are a sound setting (tone, volume), a language setting (language selection), an energy-saving setting (energy-saving time setting), a business use mode setting, a paper feed tray setting (paper size/type), a screen saver, and a display setting for UI display.

When the worker specifies the installation environment by way of the operator 160, the image forming apparatus 10a performs the setting work as the kitting work.

The kitting work will be described according to the flowchart shown in FIG. 3.

First, a worker operates the operator 160 to activate the setting mode (step S11), and the destination place information acquirer 101 of the controller 100 causes the setting mode for destination place information acquisition to be displayed on a screen of the display 150 (step S12). Here, the screen as illustrated in FIG. 5 is displayed, and the installation environment of the destination place can be selected.

On the screen of the setting mode shown in FIG. 5, displays of the installation environments are provided as the destination place information so that the worker can make the setting for each destination place. More specifically, button 502 for "Store", button 503 for "Public space", button 504 for "Office", and button 505 for "Educational site" are provided. As the worker touches one of the above buttons, the destination place information (installation environment) can be specified. When the worker selects one of the buttons and touches a setting execution button 506, the selected destination place information is sent to the destination place information acquirer 101 of the controller 100, and the destination place information acquirer 101 determines that the destination place information has been input (Yes in step S13), and the processing then proceeds to the next step.

In this case, it is assumed that the button 502 for "Store", for example, is selected. That is, the operator 160, which is a touch panel, is incorporated in the display 150, and as the worker touches the button 502 for "Store", "Store" is selected as the destination place information.

The destination place information acquirer 101 of the controller 100 acquires the selected destination place information (step S14), and the setting information acquirer 102 of the controller 100 acquires the setting information corresponding to "Store", which is the acquired installation environment, from the pieces of setting information stored in the storage 120 (step S15). Then, the setting processor 103 of the controller 100 executes the setting processing for each setting item in accordance with the acquired setting information (step S16).

When the setting processing is complete, as shown in FIG. 6, the UI display is performed as the portal screen (initial operation screen) for "Store" on a display screen of the display 150. The setting for "Store" enables most of the functions of the MFP to be executed. Consequently, button 511 for "Simple copy", button 512 for "Connect with smartphone", button 513 for "Copy", button 514 for "Fax", button 515 for "Scan", button 516 for "Print", button 517 for "Photo service", button 518 for "Network print", and button 519 for "Administrative services" are displayed.

The screen saver is of a general type, as shown in FIG. 7, and an explanatory text 520, which is "Please touch the screen", is displayed. In other words, FIG. 7 displays that the screen can be reinstated to the portal screen of FIG. 6 by the user's touch on the screen. Note that the screen saver screen is not limited to the above example, and an explanatory text explaining how to use "Administrative services", for example, may be displayed.

Installation Work

The image forming apparatus 10a for which the kitting work is complete is packaged again, and sent to the installation site. At the installation site, a serviceman performs the setting work suitable for the installation site in accordance with a manual as usual.

The worker who performs the kitting work only needs to specify the installation environment, which corresponds to the destination place information, from the display screen of the setting mode. After that, the image forming apparatus 10a acquires the setting information corresponding to the specified installation environment and makes the settings. Thus, there is no need to make the settings for individual items manually, and the work efficiency is improved as the effort is saved.

Second Embodiment

Hereinafter, a second embodiment of the present invention will be described with reference to the accompanying drawings.

Figure 8:
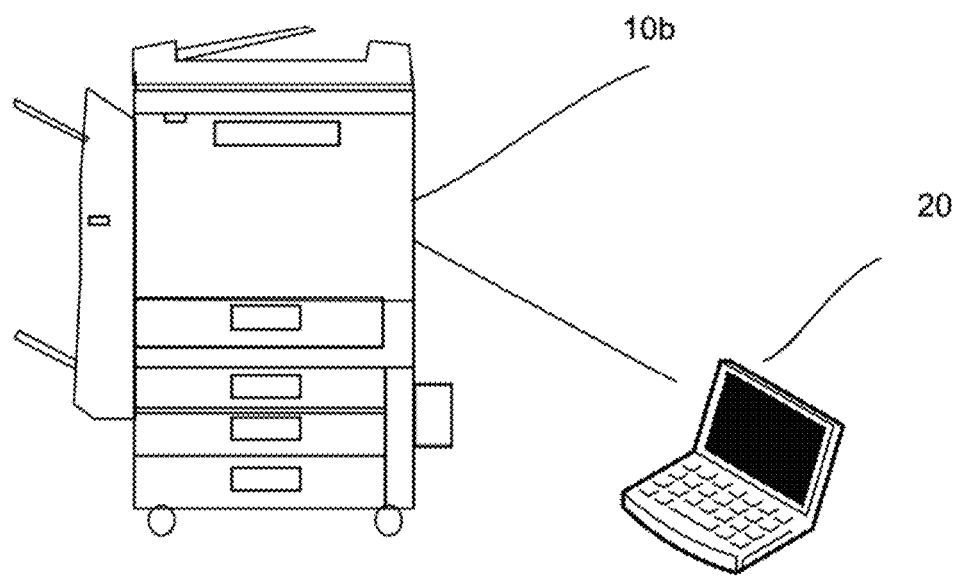
FIG. 8 is an explanatory diagram illustrating a configuration of a setting system for an image forming apparatus and a terminal device according to a second embodiment of the present invention.
Figure 9:
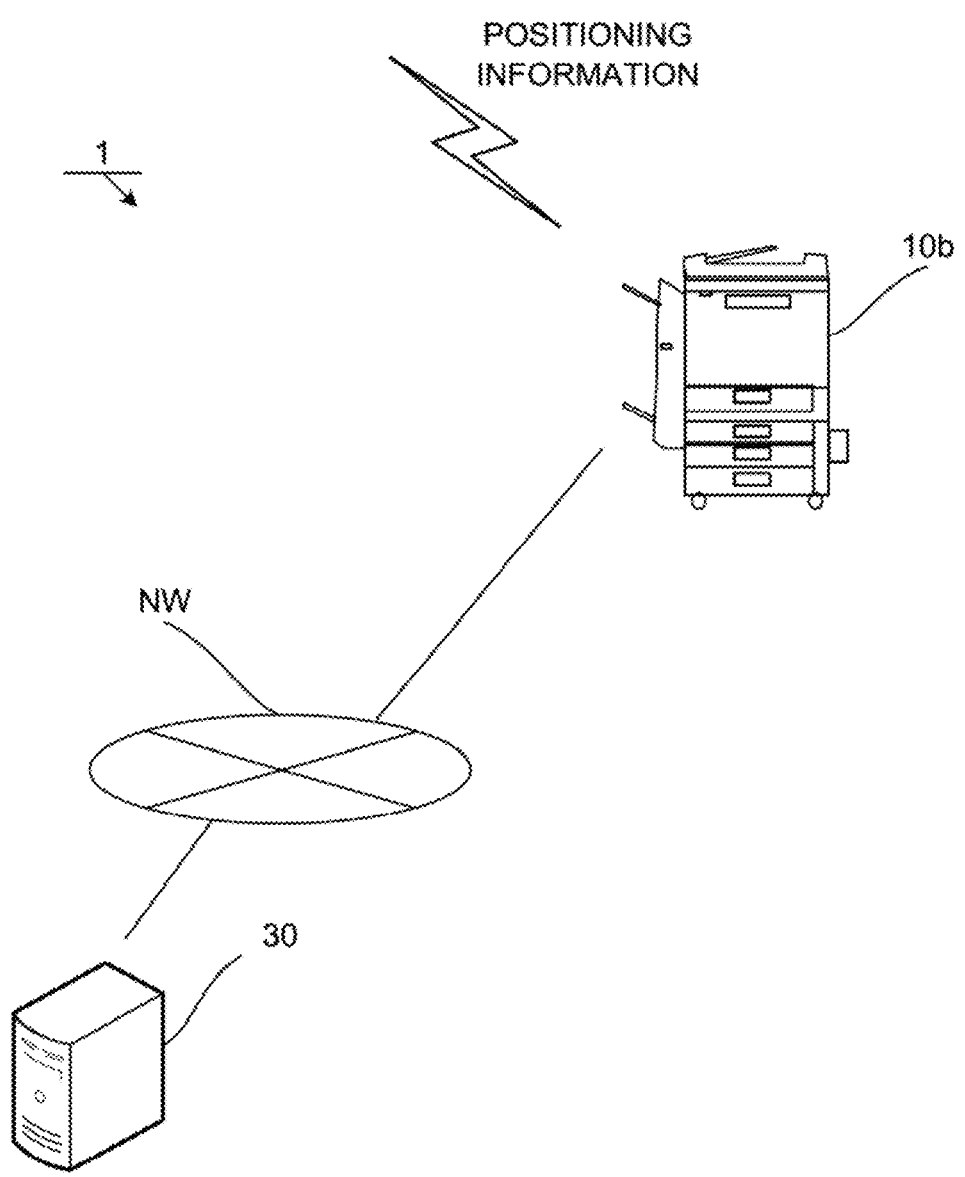
FIG. 9 is an explanatory diagram illustrating a configuration of a setting system for the image forming apparatus and a server according to the second embodiment.
Figure 10:
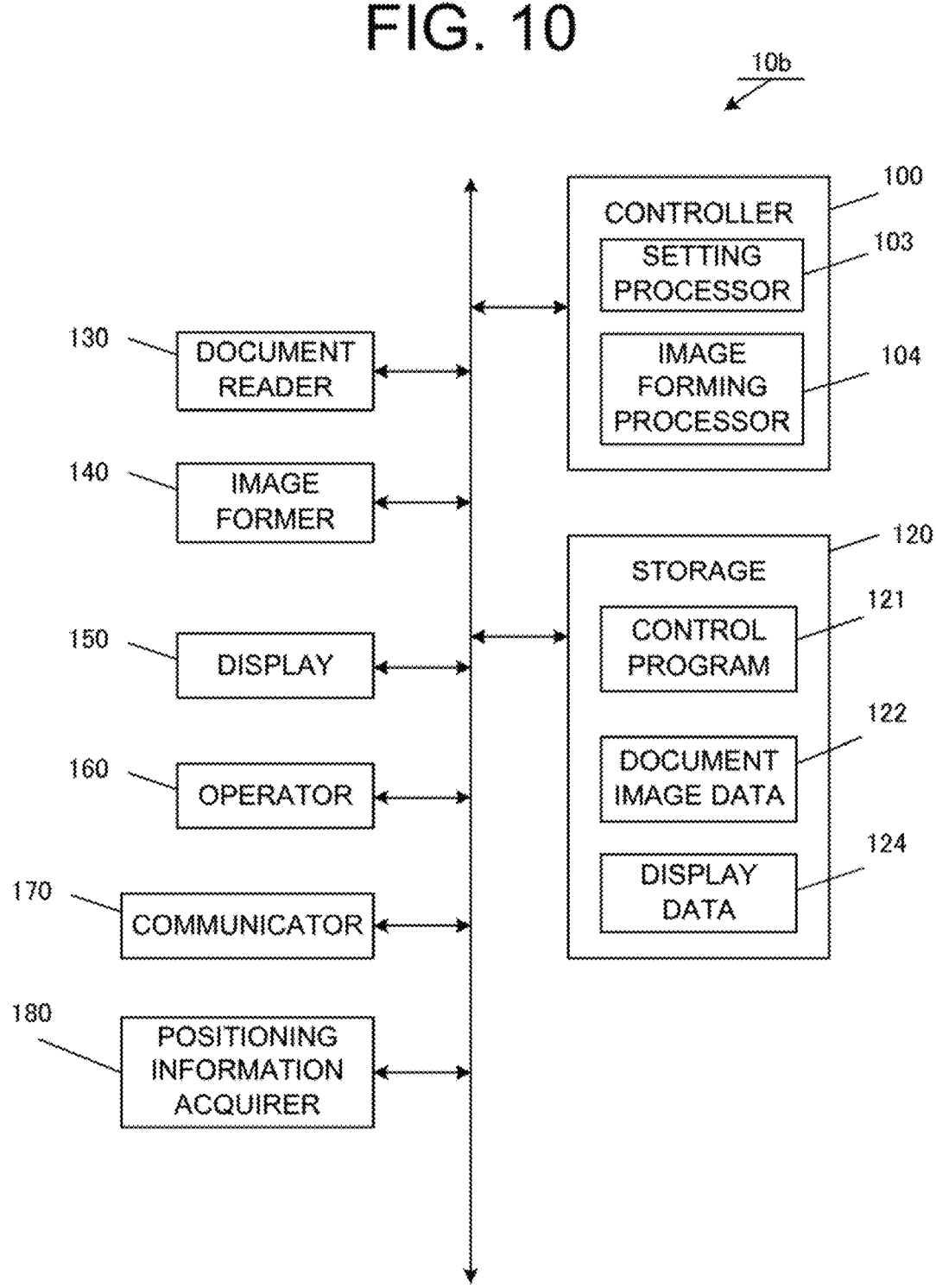
FIG. 10 is a block diagram illustrating a configuration of the image forming apparatus according to the second embodiment.
Figure 11:
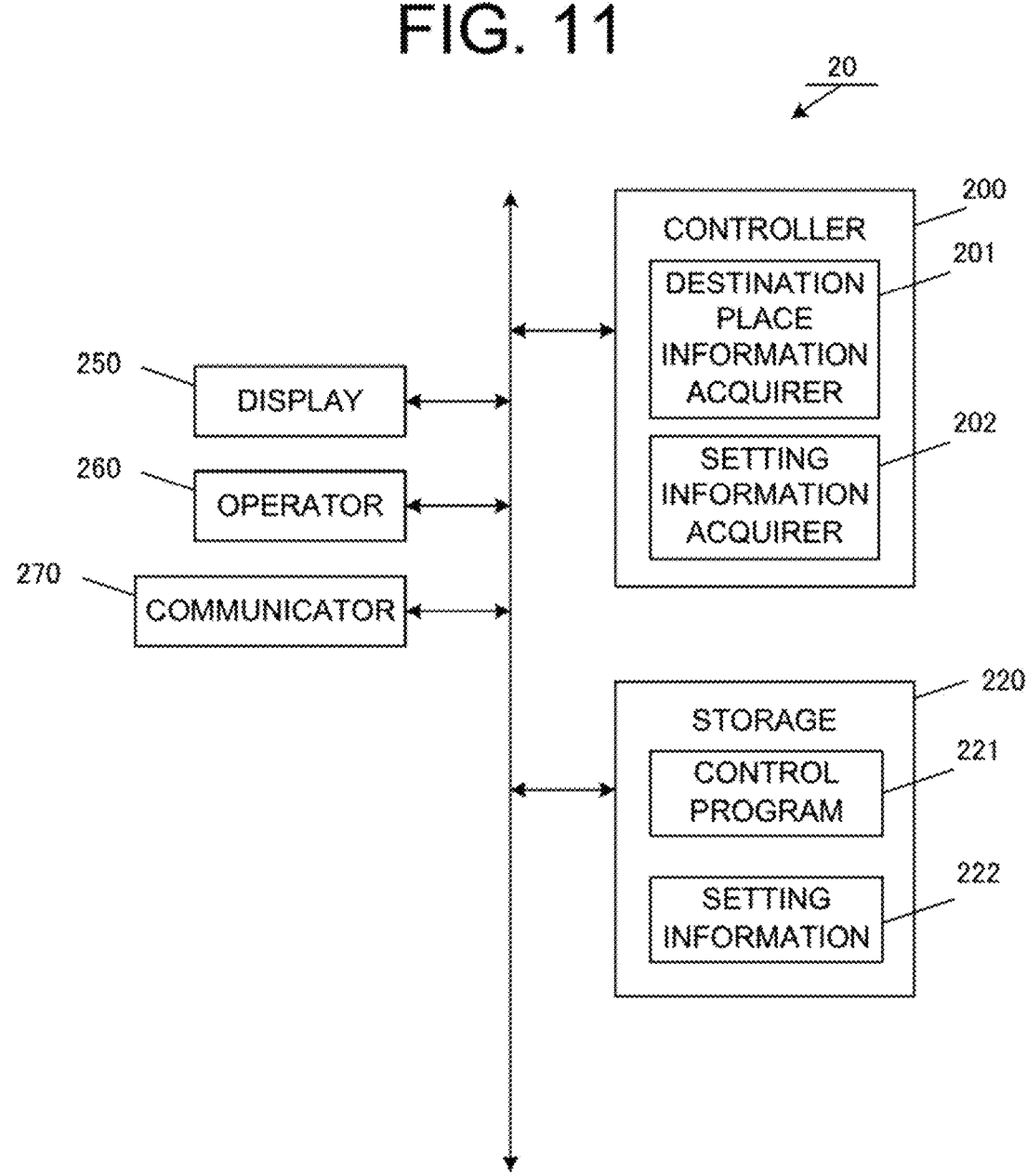
FIG. 11 is a block diagram illustrating a configuration of the terminal device according to the second embodiment.
Figure 12:
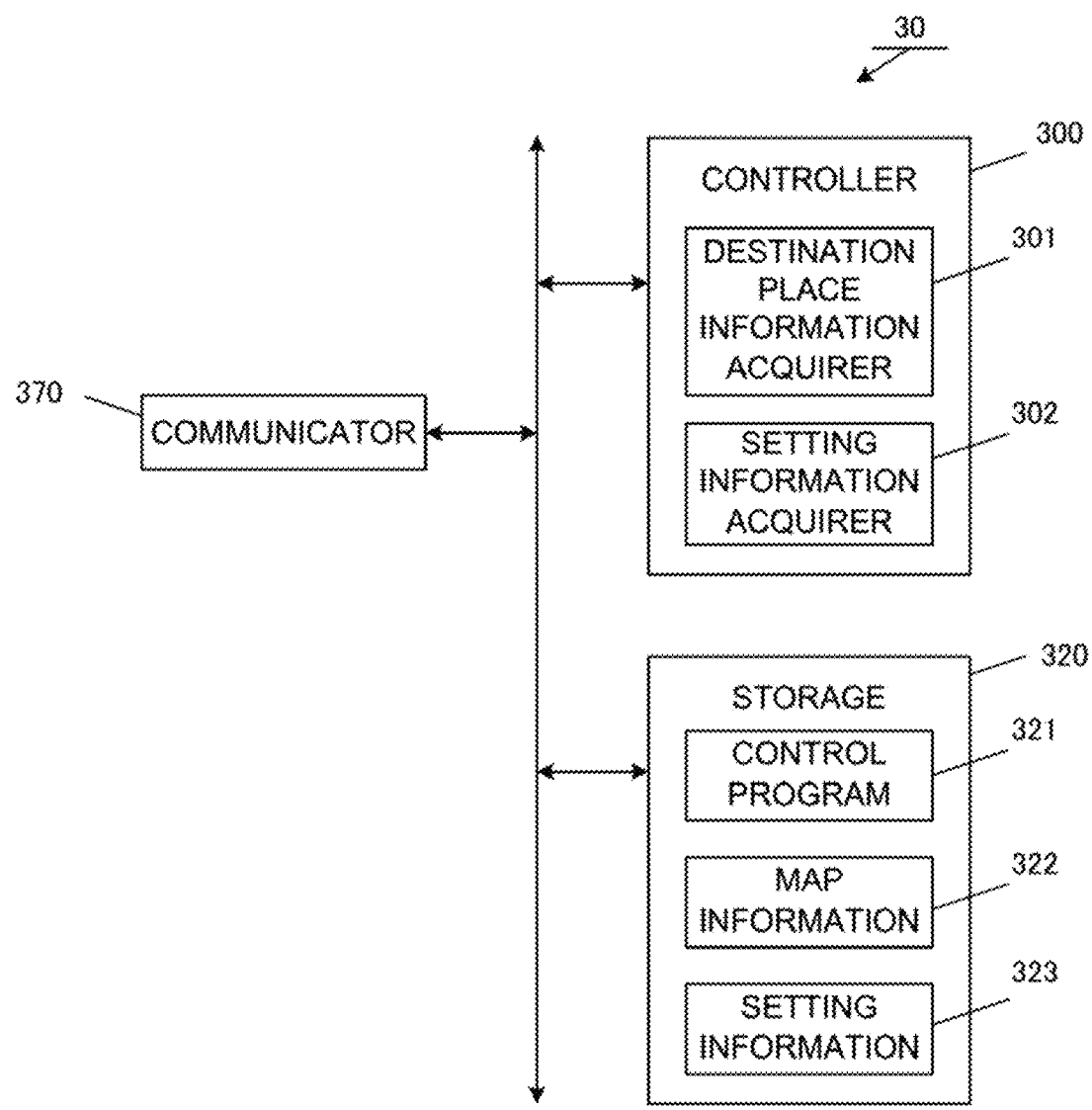
FIG. 12 is a block diagram illustrating a configuration of the server according to the second embodiment.
Figure 13:
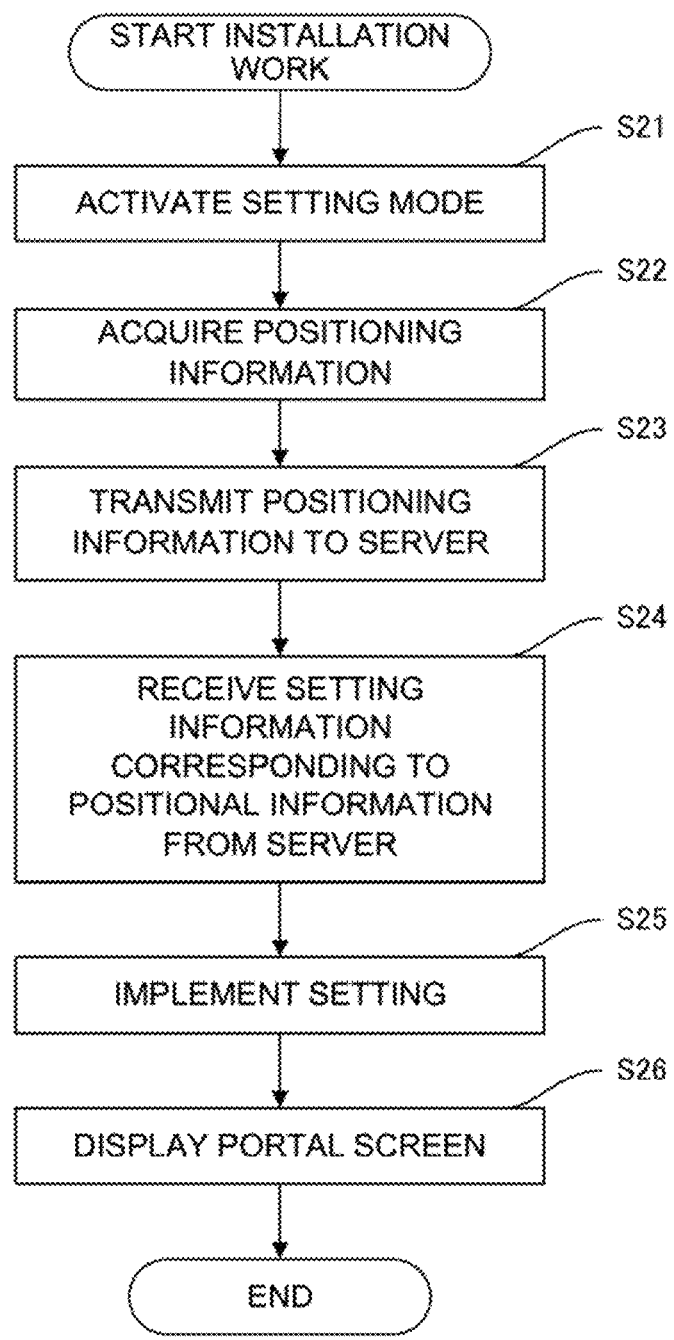
FIG. 13 is a flowchart illustrating setting processing performed by the image forming apparatus according to the second embodiment in installation work.
Figure 14:
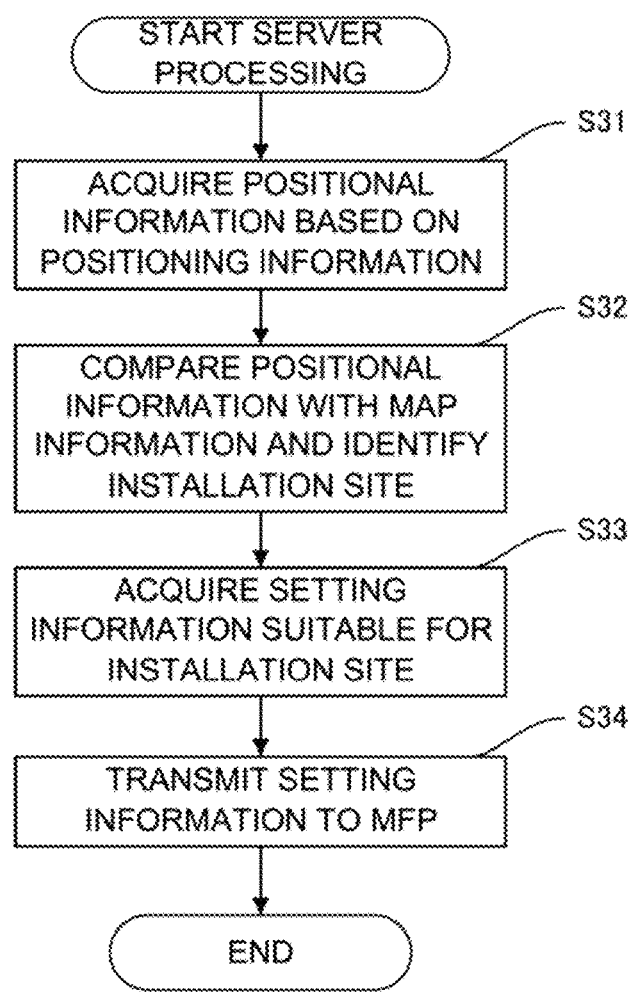
FIG. 14 is a flowchart illustrating setting processing performed by the server according to the second embodiment in the installation work.
Figure 15:
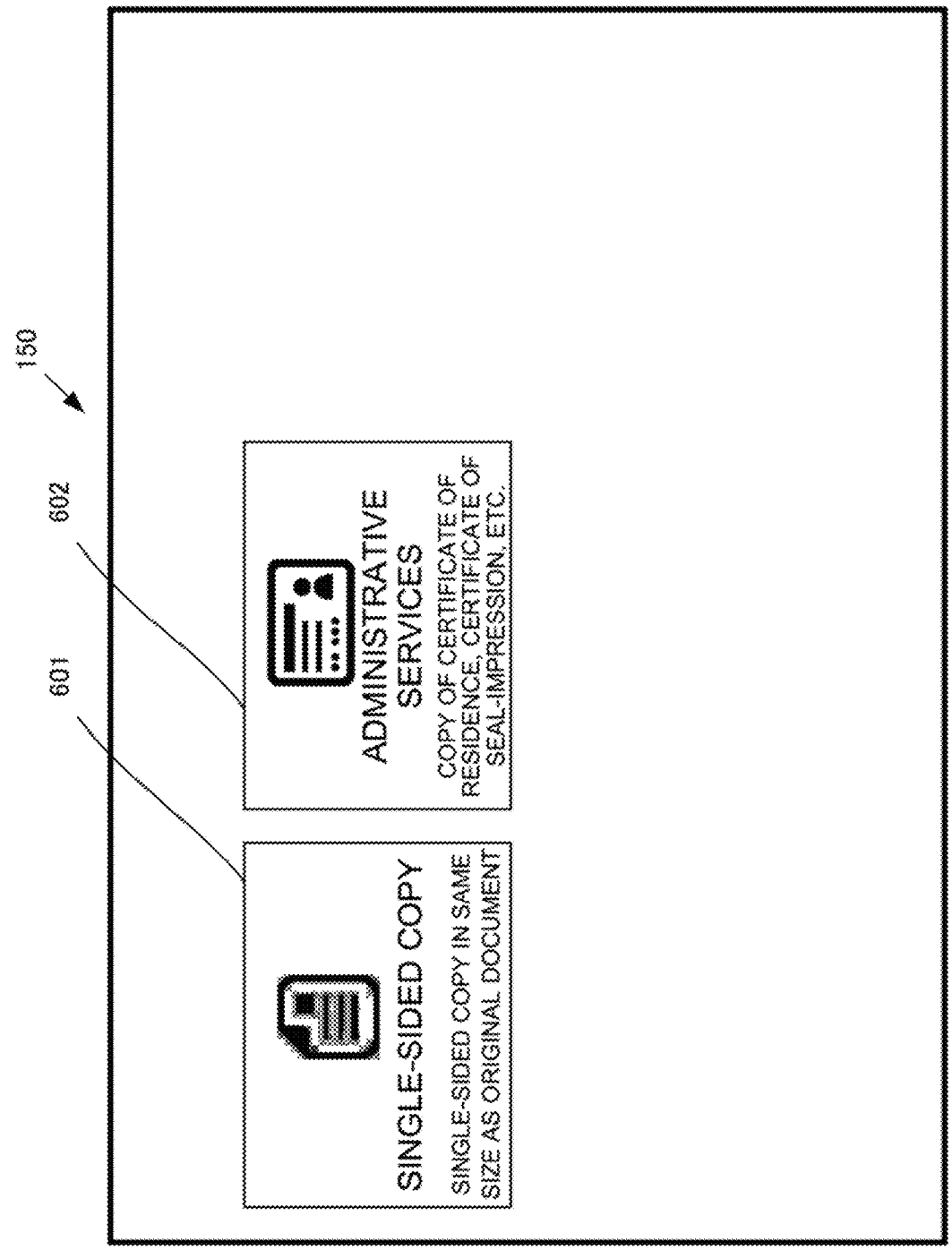
FIG. 15 is a diagram illustrating a portal screen of the image forming apparatus according to the second embodiment after setting by the kitting work is complete.

FIG. 8 is an explanatory diagram illustrating a configuration of a setting system for an image forming apparatus 10b and a terminal device 20 according to a second embodiment of the present invention; FIG. 9 is an explanatory diagram illustrating a configuration of a setting system for the image forming apparatus 10b and a server 30; FIG. 10 is a block diagram illustrating a configuration of the image forming apparatus 10b; FIG. 11 is a block diagram illustrating a configuration of the terminal device 20; FIG. 12 is a block diagram illustrating a configuration of the server 30; FIG. 13 is a flowchart illustrating setting processing performed by the image forming apparatus 10b in installation work; FIG. 14 is a flowchart illustrating setting processing performed by the server 30 in the installation work; FIG. 15 is a diagram illustrating a portal screen of the image forming apparatus 10b after setting by the kitting work is complete; FIG. 16 is a diagram illustrating a screen saver screen of the image forming apparatus 10b; and FIG. 17 is a diagram illustrating a portal screen of the image forming apparatus 10b after setting by the installation work is complete.

Description of Outline

In the second embodiment, setting work by the kitting work and by work at the installation site is automated.

By the kitting work, the worker makes the setting according to the type of installation environment similar to that of the first embodiment. However, in the second embodiment, the terminal device 20 for setting work is used.

In the subsequent installation work, a service man handles only the work of establishing the Internet connection, and the image forming apparatus 10b thereafter acquires positioning information such as Global Positioning System (GPS) information, and sends the acquired positioning information to the server 30 on the Internet. The server 30 generates positional information from the positioning information, and compares the generated positional information with map information 322 in a storage 320, thereby identifying the installation site to be applied as the destination place information. Further, the server 30 acquires setting information suitable for the installation site in question from setting information 323 in the storage 320, and sends the setting information to the image forming apparatus 10b. The image forming apparatus 10b acquires the setting information and automatically performs the setting work in accordance with the acquired setting information.

Functional Configuration of Image Forming Apparatus

A functional configuration of the image forming apparatus 10b of the second embodiment will be described with reference to FIG. 10.

Parts that are the same as those of the image forming apparatus 10a of the first embodiment shown in FIG. 2 are designated by the same reference numerals, and will not be described. The points in which the image forming apparatus 10b is distinguished from the image forming apparatus 10a of the first embodiment are that a controller 100 does not include a destination place information acquirer 101 and a setting information acquirer 102; a storage 120 does not include setting information; and a positioning information acquirer 180, which acquires positioning information such as GPS satellite signals, is newly provided. The kitting work is performed by using the terminal device 20.

Functional Configuration of Terminal Device

A functional configuration of the terminal device 20 of the second embodiment will be described with reference to FIG. 11.

The terminal device 20 is provided with a controller 200, a display 250, an operator 260, a communicator 270, and a storage 220. In the storage 220, a control program 221 and setting information 222 are stored.

The controller 200 is a functional part for controlling the whole of the terminal device 20. The controller 200 realizes various functions by reading and executing the control program 221 stored in the storage 220, and is composed of one or more arithmetic devices (such as a CPU).

The controller 200 comprises: a destination place information acquirer 201 which acquires destination place information including an installation site and the like; and a setting information acquirer 202 which acquires, from the storage, setting information suitable for the destination place.

The storage 220 is a functional part in which a program and data are stored. The storage 220 is composed of, for example, a semiconductor memory such as an SSD, or an HDD.

The control program 221 is a program related to operation control of the terminal device 20.

The setting information 222 is information on the setting content according to the installation environment of each destination place.

Configuration of Setting System in Installation Work

A setting system 1 employed in installation work for the image forming apparatus according to the second embodiment is a system in which the image forming apparatus 10b and the server 30 are communicably connected via a network NW, as shown in FIG. 9.

In the setting system 1, the server 30 acquires the setting information of the image forming apparatus 10b according to the information on a place of installation of the image forming apparatus 10b, and sends the acquired setting information to the image forming apparatus 10b via the network. The image forming apparatus 10b automatically performs the setting processing on the basis of the setting information.

Functional Configuration of Server

A functional configuration of the server 30 of the second embodiment will be described with reference to FIG. 12.

The server 30 is provided with a controller 300, the storage 320, and a communicator 370. In the storage 320, a control program 321, the map information 322, and the setting information 323 are stored.

The controller 300 is a functional part for controlling the whole of the server 30. The controller 300 realizes various functions by reading and executing the control program 321 stored in the storage 320, and is composed of one or more arithmetic devices (such as a CPU).

The controller 300 comprises: a destination place information acquirer 301 which acquires destination place information including an installation site and the like; and a setting information acquirer 302 which acquires, from the storage, setting information suitable for the destination place.

The storage 320 is a functional part in which a program and data are stored. The storage 320 is composed of, for example, a semiconductor memory such as an SSD, or an HDD.

The storage 320 stores the control program 321, the map information 322 for use in acquiring positional information from positioning data and identifying the installation site, and the setting information 323 of the image forming apparatus 10b.

The control program 321 is a program related to operation control of the server 30.

The map information 322 is information for use in obtaining the positional information from the positioning information, and identifying the installation site from the positional information.

The setting information 323 corresponds to pieces of setting information of the image forming apparatus 10b for each of the installation sites, and all of the pieces of setting information are registered in advance.

The communicator 370 communicates with other devices. For example, it suffices that the communicator 370 includes an interface connectable to a network, and can communicate with the other devices via a wired/wireless local area network (LAN). Note that image data may be sent to or received from the other device (for example, a USB flash drive) by a universal serial bus (USB) interface or the like.

Kitting Work

The kitting work of the present embodiment is the same as that of the first embodiment in that the worker sets up the image forming apparatus 10b, but is different in that the terminal device 20 is used for making the setting. Accordingly, the storage 120 of the image forming apparatus 10b does not store setting information, but the terminal device 20 stores the setting information 222, and the setting information is sent to the image forming apparatus 10b from the terminal device 20.

A setting flow in the kitting work is the same as the flow in the first embodiment shown in FIG. 3, but an acting subject in the flow is different. Steps S11 to S13 are performed by the destination place information acquirer 201 and the setting information acquirer 202 of the controller 200 in the terminal device 20 for setting, and step S14 and the subsequent steps are performed by the controller 100 of the image forming apparatus 10b. A screen for destination place information selection for kitting work as shown in FIG. 5 is displayed on the display 250 of the terminal device 20 to have the worker select the destination place information, and the destination place information is thereby sent from the terminal device 20 to the image forming apparatus 10b. The subsequent processing is the same as that of the first embodiment.

FIG. 15 shows the portal screen of step S17. It is assumed that the worker has selected "Public space". On the portal screen of the above case, button 601 for "Single-sided copy", and button 602 for "Administrative services" are displayed. Further, a screen saver displays an explanation 603 for the "Administrative services" button, as shown in FIG. 16.

Installation Work

The image forming apparatus 10b for which the kitting work is complete is packaged, and installed at the installation site. After a serviceman has set up a connection to the Internet, the image forming apparatus 10b automatically performs the setting work by itself. As the setting content of the installation work, functions specific to the installation site are added. For example, advertisements related to the place, designs and characters representing features unique to that district, map display, and functions specific to the installation site are added.

FIG. 13 is a flowchart illustrating the setting processing performed by the image forming apparatus 10b in the installation work of the second embodiment. FIG. 14 is a flowchart illustrating the setting processing performed by the server 30.

After installing the image forming apparatus 10b, a serviceman connects the image forming apparatus 10b to the Internet, and activates the setting mode (step S21). The controller 100 of the image forming apparatus 10b acquires positioning information by the positioning information acquirer 180 (step S22). Satellite positioning using GPS, for example, is assumed, but a way to acquire the positioning information is not limited to the satellite positioning. The positioning information is sent to the server 30 via the network (step S23).

The destination place information acquirer 301 provided in the controller 300 of the server 30 acquires positional information (information on the longitude, latitude, and altitude) on the basis of the positioning information (step S31). Then, the destination place information acquirer 301 compares the positional information with the map information 322 stored in the storage 320 to identify the installation site (step S32). The installation site corresponds to destination place information represented by an address, an installation environment, a building name, and the like. Here, it is assumed that an installation site, which is "ABC Post Office", is specified. The setting information acquirer 302 of the controller 300 acquires, from the storage 320, the setting information suitable for the above installation site (destination place information) (step S33), and transmits the acquired setting information to the image forming apparatus 10b via the communicator 370 (step S34).

When a setting processor 103 provided in the controller 100 of the image forming apparatus 10b acquires, as a result of receiving from a communicator 170, the setting information sent from the server 30 (step S24), the setting processor 103 executes the setting processing in accordance with the acquired setting information (step S25). Then, when the setting is complete, a portal screen is displayed (step S26).

For example, in the case of a post office in Kyushu, a portal screen as shown in FIG. 17 is displayed. Pieces of information related to the place or region, such as a name 611 of the post office, a button 612 for "Postcard print" for post office, a notice 613 from the post office, and an advertisement 614 of the Kyushu district are displayed, in addition to the screen display of FIG. 15.

As can be seen, in addition to the advantage of the first embodiment, the present embodiment can save effort and time since in the installation work, the serviceman needs to only install the image forming apparatus and set up the network connection, and the setting system automatically performs the subsequent setting work.

Third Embodiment

Hereinafter, a third embodiment of the present invention will be described with reference to the accompanying drawings.

FIG. 18 is a diagram illustrating a portal screen of an image forming apparatus 10b according to a third embodiment of the present invention.

Description of Outline

Kitting work is not performed for the image forming apparatus 10b of the third embodiment, but the image forming apparatus 10b automatically performs the setting work when installed at the installation site.

The image forming apparatus 10b is directly conveyed to the installation site, and a serviceman connects the image forming apparatus 10b to the Internet. The image forming apparatus 10b acquires positioning information, and sends the positioning information to a server 30. The server 30 generates positional information from the positioning information, and compares the generated positional information with map information, thereby identifying the installation site (destination place information). Further, the server 30 acquires the setting information suitable for the installation site, and sends the acquired setting information to the image forming apparatus 10b. The image forming apparatus 10b acquires the setting information and automatically performs the setting work.

System Configuration and Functional Configuration of Each Device

The setting system for the image forming apparatus of the third embodiment is the same as that shown in FIG. 9. Since the image forming apparatus 10b and the server 30 are the same as those of FIGS. 10 and 12, detailed description of these elements is omitted.

Installation Work

Kitting work is not performed for the image forming apparatus 10b, and the image forming apparatus 10b is directly conveyed to the installation site and installed. After a serviceman has set up a connection to the Internet, the image forming apparatus 10b automatically performs the setting work by itself.

The flowcharts of the image forming apparatus 10b and the server 30 to indicate the setting work in the above procedure are the same as the flowcharts shown in FIGS. 13 and 14.

After installing the image forming apparatus 10b, a serviceman connects the image forming apparatus 10b to the Internet, and applies the setting mode (step S21). The image forming apparatus 10b acquires the positioning information by a positioning information acquirer 180 (step S22). Satellite positioning using GPS, for example, is assumed, but a way to acquire the positioning information is not limited to the satellite positioning. The positioning information is sent to the server 30 via a network (step S23).

A controller 300 of the server 30 acquires positional information (longitude and latitude) on the basis of the positioning information (step S31). Then, the controller 300 compares the positional information with map information 322 stored in a storage 320 to identify the installation site (destination place information) (step S32). The installation site corresponds to information such as an address, an installation environment, and a building name. Here, it is assumed that an installation site, which is "XYZ Private Tutoring School", is specified. The server 30 acquires, from the storage 320, the setting information suitable for the above installation site (step S33), and transmits the acquired setting information to the image forming apparatus 10b via a communicator 370. The setting content may be setting content of "Educational site", which is one of the installation types indicated in FIG. 4, and setting content related to the place or region.

When a controller 100 of the image forming apparatus 10b receives the setting information, which is sent from the server 30, from a communicator 170 (step S24), the controller 100 executes the setting processing in accordance with the setting information (step S25). Then, when the setting is complete, a portal screen is displayed (step S26).

On the portal screen of FIG. 18, 711 representing "Name of Private Tutoring School", button 712 for "Single-sided copy", button 713 for "Copy", button 714 for "Scan", button 715 for "Photo/Document print", button 716 for "Network print", button 717 for "Marking scan", and 718 representing "Notice" are displayed. The button 717 for "Marking scan" is a service button for scanning a result of the marking of a handout of homework or a test, and transmitting the result to the student's PC, and is a button displayed in the installation environment corresponding to "Educational site".

Under 718, which indicates the "Notice", 719 representing notice details such as the schedule of "** Trial Examination", and the schedule of "Special Lecture by Teacher X" are displayed.

Although a screen of the screen saver is not illustrated in the drawing, for example, an explanation for "Marking scan" may be displayed.

As can be seen, in the installation work, what the serviceman needs to do is only to install the image forming apparatus and set up the network connection. In other words, since the setting system automatically performs the subsequent setting work, the effort and time can be saved.

Note that in the third embodiment, the server 30 is provided with a destination place information acquirer, a storage, and a setting information acquirer to carry out the processing. However, a part of or all of the aforementioned features may be provided in the image forming apparatus 10b. As a result, the server 30 and the image forming apparatus 10b may exchange data to perform the processing, or the processing may be performed by the image forming apparatus 10b alone.

Also, in the first to third embodiments, the image forming apparatus has been described as an MFP, but is not limited to the MFP. That is, the setting can be made similarly for an image forming apparatus such as a dye sublimation printer used in photographic printing, for example.

A program which operates in the setting system for the image forming apparatus according to the present invention may be a program (a program which causes a computer to function) for controlling a CPU, etc., in order to realize the functions of the above-described embodiments pertaining to the present invention. Further, information handled in the above-mentioned apparatuses is temporarily accumulated in random access memory (RAM) when being processed. Then, the information is stored in various read-only memory (ROM) such as flash ROM or a hard disk drive (HDD), and is read, modified, or written by the CPU, as necessary. Moreover, by recording a program for realizing the function of each component on a computer-readable recording medium, and causing a computer system to read the program recorded on such a recording medium and execute the program, the processing of each part may be performed. It is assumed that the "computer system" in the above includes an OS and hardware such as peripheral devices.

Also, the "computer-readable recording medium" refers to a portable medium such as a flexible disk, a magneto-optical disk, a ROM, a CD-ROM, or a storage device such as a hard disk incorporated in the computer system. Further, the above program may be one for realizing a part of the aforementioned functions, and may further be one which can realize the aforementioned functions in combination with a program already recorded in the computer system.

The embodiments of the present invention have been described in detail with reference to the accompanying drawings. However, the specific configuration is not limited to the configurations of the embodiments, and an invention with a design change or the like not departing from the spirit of the present invention is also included in the present invention.

EXPLANATION OF SYMBOLS

1 Setting system
10a, 10b Image forming apparatus
20 Terminal device
30 Server
100 Controller
101 Destination place information acquirer
102 Setting information acquirer
103 Setting processor
104 Image forming processor
120 Storage
121 Control program
122 Document image data
123 Setting information
124 Display data
150 Display
160 Operator
170 Communicator
180 Positioning information acquirer
200 Controller
201 Destination place information acquirer
202 Setting information acquirer
220 Storage
221 Control program
222 Setting information
250 Display
260 Operator 270 Communicator
300 Controller
301 Destination place information acquirer
302 Setting information acquirer
320 Storage
321 Control program
322 Map information
323 Setting information
370 Communicator

What is claimed is:

1. An image forming apparatus comprising:
a processor; and
a memory,
wherein the memory stores instructions that cause the processor to:
   acquire destination place information regarding a destination place of installation;
   store respective pieces of information including setting information regarding a setting according to the destination place in the memory;
   acquire the setting information from the memory, based on the destination place information acquired;
   implement the setting based on the setting information acquired;
   acquire positional information of the image forming apparatus;
   store map information in the memory,
   identify, from the map information stored in the memory, an installation site of the image forming apparatus corresponding to the positional information acquired, and
   apply the installation site as the destination place information.

2. A setting system comprising an image forming apparatus and a terminal device connected to the image forming apparatus, the setting system making a setting for the image forming apparatus,
the terminal device comprising:
   a processor; and
   a memory,
   wherein the memory of the terminal device stores instructions that cause the processor of the terminal device to:
      acquire destination place information regarding a destination place where the image forming apparatus is to be installed;
      store respective pieces of information including setting information regarding the setting according to the destination place in the memory;
      acquire the setting information from the memory, based on the destination place information acquired; and
the image forming apparatus comprising:
   a processor; and
   a memory,
   wherein the memory of the image forming apparatus stores an instruction that cause the processor of the image forming apparatus to:
      implement the setting based on the setting information acquired.

3. The setting system for the image forming apparatus according to claim 2, wherein the memory of the image forming apparatus further stores map information and instructions that cause the processor of the image forming apparatus to:
   acquire positional information of the image forming apparatus, and
   identify, from the map information stored in the memory of the image forming apparatus, an installation site of the image forming apparatus corresponding to the positional information acquired, and
   apply the installation site as the destination place information.

4. A setting method for an image forming apparatus, the setting method being usable for making a setting for the image forming apparatus, and comprising:
   storing respective pieces of information including setting information regarding the setting according to the destination place and map information;
   acquiring positional information of the image forming apparatus;
   acquiring destination place information regarding a destination place where the image forming apparatus is to be installed by identifying, from the map information, an installation site of the image forming apparatus corresponding to the positional information acquired;
   acquiring the setting information on a basis of the destination place information acquired; and
   performing setting processing to implement the setting based on the setting information acquired.

5. A non-transitory computer-readable recording medium storing a program for causing a computer to implement the setting method for an image forming apparatus according to claim 4.

* * * * *